US 6,491,746 B2

(12) United States Patent
Summerfield

(10) Patent No.: US 6,491,746 B2
(45) Date of Patent: Dec. 10, 2002

(54) PROTECTIVE COATING

(75) Inventor: Stephen R. Summerfield, Chesterfield, MI (US)

(73) Assignee: Gage Products Company, Ferndale, MI (US)

( * ) Notice: Subject to any disclaimer, the term of this patent is extended or adjusted under 35 U.S.C. 154(b) by 0 days.

(21) Appl. No.: 09/880,483

(22) Filed: Jun. 13, 2001

(65) Prior Publication Data

US 2002/0017223 A1 Feb. 14, 2002

Related U.S. Application Data

(60) Provisional application No. 60/211,615, filed on Jun. 14, 2000.

(51) Int. Cl.$^7$ .............................. C09D 5/00; C09K 3/18; B05D 3/00; B65B 33/00
(52) U.S. Cl. .................. 106/2; 106/243; 106/287.39; 106/287.35; 427/154; 252/88.2
(58) Field of Search .................. 252/88.2; 427/154; 106/2, 243, 287.34, 287.35

(56) References Cited

U.S. PATENT DOCUMENTS

| | | | |
|---|---|---|---|
| 5,028,350 A | 7/1991 | Marsek | 252/88 |
| 5,098,450 A | 3/1992 | Patzelt et al. | 55/45 |
| 5,146,938 A | 9/1992 | Lutener et al. | 134/32 |
| 5,201,946 A | 4/1993 | Marsek | 106/208 |
| 5,308,647 A | 5/1994 | Lappi | 427/154 |
| 5,330,564 A | 7/1994 | Geke et al. | 106/2 |
| 5,418,006 A | 5/1995 | Roth et al. | 427/154 |
| 5,587,009 A | 12/1996 | Besse et al. | 106/244 |
| 5,603,992 A | 2/1997 | Woodhall et al. | 427/534 |
| 5,876,791 A | 3/1999 | Woodhall et al. | 427/156 |
| 5,998,343 A | 12/1999 | Ishii | 510/185 |
| 6,096,699 A * | 8/2000 | Bergemann et al. | 134/38 |
| 6,117,485 A | 9/2000 | Woodhall et al. | 427/156 |
| 6,191,087 B1 | 2/2001 | Opre et al. | 510/201 |
| 6,191,097 B1 | 2/2001 | Leuder et al. | 510/444 |

* cited by examiner

*Primary Examiner*—David Brunsman
(74) *Attorney, Agent, or Firm*—Gifford, Krass, Groh, Sprinkle, Anderson & Citkowski, P.C.

(57) ABSTRACT

Compositions and methods for use in temporarily protecting a paint booth surface are described which allow removal of the protective composition and undesired overspray with a low pressure stream of water. The protective composition is a mixture containing at least a hydrophobic solvent comprising a $C_{1-4}$ alkyl ester of a $C_{16-18}$ fatty acid, a surfactant and a thickener.

26 Claims, No Drawings

PROTECTIVE COATING

RELATED APPLICATION

This patent application claims priority of Provisional Patent Application Serial No. 60/211,615 filed Jun. 14, 2000 and entitled "Protective Coating."

FIELD OF THE INVENTION

This invention relates generally to protective coatings. More specifically, the invention relates to a protective coating which is water removable and which can be applied to a variety of surfaces to aid in the removal of paint overspray therefrom.

BACKGROUND OF THE INVENTION

In many industrial applications, high volume, high speed painting operations are carried out in facilities often referred to as spray booths. Paint overspray builds up on the walls, floor gratings and other structures of the booth. Likewise, paint overspray accumulates on conveyors, racks and other equipment which transports articles through a paint spray facility. It is necessary to periodically remove built up paint overspray. In order to facilitate the ready removal of such paint overspray, a variety of protective coatings have been developed. These coatings are applied to equipment and structures which come in contact with paint overspray, and function to decrease the adherence of the paint. Such coatings typically include various polymeric materials, oils, greases, waxes and the like.

Ideally, a protective coating used in such applications prevents adherence of both solvent and water-based paints to underlying structures. The coatings should also allow for ready removal of the paint, preferably by washing with a relatively low pressure stream of water. In addition, coatings should be reasonably well adherent to the structures and they should not adversely interfere with the painting process. The coating should also be low in toxicity, and preferably low in cost.

The prior art has implemented a variety of protective coating compositions.

U.S. Pat. Nos. 5,876,791 and 6,117,485 disclose the use of dextrin-based compositions which are dried onto a surface in order to protect it from paint overspray.

U.S. Pat. No. 5,603,992 describes a method for protecting an activated plastic surface by application of a compound containing dextrin, cellulose or a cellulose derivative.

U.S. Pat. No. 5,418,006 discloses a two step method for protecting a surface in which the surface is first treated with a water repellent substance and then coated with an aqueous composition.

U.S. Pat. No. 5,308,647 details a composition comprising water soluble polyglycerols and methods for use in masking areas of a surface to prevent overspray.

U.S. Pat. No. 6,191,097 discloses a biodegradable solvent composition.

While specific prior art coatings work well in particular applications, heretofore employed, compositions are generally not usable with both water and solvent-based paints. In addition, many of the prior art compositions employ relatively expensive polymeric components. As will be explained in detail hereinbelow, the present invention provides a protective coating composition which prevents adherence of both solvent and water-based paints to a variety of substrates. The coating of the present invention is water removable. In addition, it does not contain any volatile organic compounds or toxic materials and is relatively low in cost.

BRIEF DESCRIPTION OF THE INVENTION

Disclosed herein is a water removable protective coating which is comprised of a hydrophobic solvent which is a C1–C4 alkyl ester of a C16–C18 fatty acid, together with a surfactant in an amount sufficient to render the hydrophobic solvent water dispersible. The composition may further include a thickening agent. In specific embodiments, the hydrophobic solvent comprises at least 70%, by weight, of the composition, and in specific embodiments it comprises at least 90% by weight of the composition. The surfactant may comprise 0.1–10% by weight of the composition, and may comprise a nonionic or ionic surfactant.

Also disclosed herein is a process for temporarily protecting a surface from overspray by applying a protective composition to the surface wherein the protective composition is comprised of a hydrophobic solvent, a surfactant, and a thickening agent. The protective coating may be removed from the surface by a fluid stream, such as a stream of low pressure water.

DETAILED DESCRIPTION OF THE INVENTION

The present invention comprises a protective coating which functions to prevent the adherence of both solvent-based and water-based paints to a variety of substrates. The coating of the present invention has significant utility in high volume industrial painting applications for aiding in the removal of overspray from paint booths, conveyors, frames and other material handing equipment. Additionally, the composition of the present invention, owing to its low toxicity, may be used in consumer applications as a paint maskant.

The composition of the present invention includes a major component which is a hydrophobic solvent material capable of softening or dissolving a component of the paint. Within the context of this disclosure, a hydrophobic material is defined as being a material which is substantially insoluble in water, and typically comprises a material which has no more than 1% solubility in water at room temperature. The coating composition of the present invention further includes a surfactant material in an amount sufficient to solubilize the hydrophobic solvent in water. Most typically, the surfactant will be present in an amount of no more than 5% by weight. The composition also includes a thickening agent which gels the composition, or increases its viscosity such that it is capable of adhering to a vertical surface.

In use, the composition is applied to the surface to be protected by spraying, brushing, dipping, rolling or any other such coating technique. In particular applications, the coating may be made thixotropic to aid in application. Owing to its viscosity, the composition clings to the surface being protected. The protective coating forms a barrier which prevents paint from adhering to the subjacent surface. While not wishing to be bound by speculation, the inventors hereof presume that the hydrophobic solvent interacts with the film forming components of the paint so as to prevent it from forming an adherent film. In the instances where the paint is water based, the presence of the surfactant facilitates the solvent's interaction with the resins, latexes, or other organic components of the paint. In those instances where the paint is solvent based, the hydrophobic component directly interacts with the solvent and/or the film-forming components of the paint. Whatever the mode of action, it has been found that compositions of the present invention allow paint overspray to be readily removed by relatively low pressure (typically no more than 1000 psi, and preferably no more than 200 psi) water. It is believed that the presence of the surfactant facilitates removal of the composition by solubilizing the hydrophobic component thereby allowing the coating to be washed away.

The hydrophobic solvent preferably comprises a relatively high molecular weight, low flash point, low VOC solvent material. One particularly preferred group of materials comprises fatty acid esters, most preferably C1–C4 esters of fatty acid of 20 carbons or less. A specifically preferred group of esters comprises the C1–C4 esters of C16–C18 fatty acids. One specifically preferred material comprises a mixture of C16–C18 alkyl methyl esters. Typically, the hydrophobic solvent component of the mixture is present in an amount, by weight, of at least 90% of the composition.

A variety of surfactants may be employed in the practice of the present invention. The surfactant should be capable of rendering the solvent component water rinsible. Surfactants suitable for use in the compositions of the present invention illustratively include cationic, anionic, amphoteric, or nonionic surfactants or mixtures thereof. Examples of useful anionic surfactants are organosulfates and sulfonates, such as, for example, sodium and potassium alkyl, aryl, and aralkyl sulfates and sulfonates, including sodium 2-ethylhexyl sulfate, potassium 2-ethylhexyl sulfate, sodium nonyl sulfate, sodium lauryl sulfate, potassium methylbenzene sulfonate, sodium dodecylbenzene sulfonate, potassium toluene sulfonate and sodium xylene sulfonate; higher fatty alcohols, such as, for example, stearyl, lauryl, which have been ethoxylated and sulfonated; dialkyl esters of alkali metal sulfosuccinic acid salts, such as sodium diamyl sulfosuccinate, sodium dioxtyl sulfosuccinate, and sodium dioctyl sulfosuccinate, formaldehyde-naphthalene sulfonic acid condensation products; and alkali metal salts, partial alkali metal salts and free acids of complex organic phosphate esters. Examples of cationic surfactants illustratively include alkylamine salts such as laurylamine acetate, quaternary ammonium salts such as lauryl trimethyl ammonium chloride and alkyl benzyl dimethylammonium chlorides, and polyoxyethylenealkylamines. Examples of the amphoteric surfactants are alkylbetaines such as laurylbetaine. Examples of nonionic surfactants illustratively include polyethers, such as, for example, ethylene oxide and propylene oxide condensates which include straight and branched chain alkyl and alkaryl polyethylene glycol and polypropylene glycol ethers and thioethers; nonylphenoxypoly(ethyleneoxy) ethanols; the polyoxyalkylene derivatives of hexitol including sorbitans, sorbides, mannitans and mannides; partial long-chain fatty acids esters, such as the polyoxyalkylene derivatives of sorbitan monolaurate, sorbitan monopalmitate, sorbitan monostearate, sorbitan tristearate, sorbitan monooleate and sorbitan trioleate; ethylene oxide derivatives of long-chain carboxylic acids, such as lauric, myristic, palmitic, or oleic acids or mixtures of acids, such as tall oil fatty acids; ethylene oxide derivatives of long-chain alcohols such as octyl, decyl, lauryl, or cetyl alcohols; and ethylene oxide/propylene oxide copolymers sold under the trade name Pluoronics.

One particularly preferred group of surfactants comprises the nonionic surfactants. One particularly preferred surfactant material comprises nonylphenyl polyethylene glycol ether. Such materials are well known in the art, and are commercially available under the name Tergitol® and are available from the Union Carbide Chemical Company of Danbury, Conn. A specific, preferred surfactant is available under the designation Tergitol® NP-33. Other grades of Tergitol® such as NP-9 may be similarly employed. Other surfactants, including ionic surfactants, may also be adapted for use in the present invention, and such materials will be readily apparent to one of skill in the art. Typically, the surfactant is present in an amount of no more than 10% by weight, and most typically comprises less than 1% by weight of the composition. The amount of surfactant should be sufficient to permit the hydrophobic material to be washed off a surface by a stream of water. As such, the surfactant does not need to be present in an amount sufficient to fully solubilize the hydrophobic material; in most instances, it is only necessary that the hydrophobic material be dispersed and removed by the water.

The composition includes a thickener to increase its viscosity so that the material will reversibly adhere to vertical surfaces for a predetermined period of time. The desired period of time will depend on the circumstances of use of the composition but will typically range from one hour to ten days. Again, a variety of thickening materials are available to those of skill in the art, and such materials may be readily adapted to the practice of the present invention. One particularly preferred material comprises fumed silica. As is known in the art, this is a high porosity amorphous silica material which thickens and imparts thixotropic rheological properties to solutions. Illustrative examples of other substances used as thickening agents include cellulose derivatives such as hydroxyethylcellulose, hydroxypropyl cellulose and carboxymethyl cellulose salt; acrylic polymers such as sodium polyacrylate, and polyacrylic acid, polysaccharides, inorganic materials such as bentonite, and clays, polyvinyl alcohol, polyether compounds, urethane-modified polyether compounds, polycarboxylic acid compounds, sodium salts of polycarboxylic compounds, polyvinylpyrrolidone, polyoxyethylene derivatives such as polyethylene glycol ether and polyethylene glycol distearate and sodium alginate. Typically, the thickening agent is a minor component of the composition present in amounts ranging between 0.25% to 20% of the total weight of the composition. In a preferred embodiment of the composition, the thickening agent is present in an amount ranging from 0.5% to 15% of the total weight of the composition. In a more preferred embodiment of the composition, the thickening agent is present in an amount ranging from 1% to 10% of the total weight of the composition. The appropriate amount of thickener will depend on the circumstances of use of the composition and will be apparent to one skilled in the art. Typically, more thickener will be used where greater adherence to the surface to be protected is desired for a longer period time. In the instance where the thickening agent is amorphous fumed silica, approximately 1–5% by weight has been found sufficient to provide adequate thickening.

In addition to the foregoing, the composition of the present invention can include ancillary ingredients such as coloring agents, fragrances and the like.

One particularly preferred composition of the present invention was prepared from 95% by weight of the aforedescribed C16–C18 methyl esters, and such material is available from AG Environmental Products L.L.C. of Lenexa, Kans. under the designation Soygold® 2000. As supplied the Soygold® product includes approximately 1–3% by weight of a surfactant. The composition of the present invention further includes 3–5% by weight of amorphous fumed silica sold by the Cabot Corporation under the designation Cab-O-Sil M5. The resulting composition is a low VOC product as defined by EPA-24VOC (0.17 pounds per gallon). It is biodegradable and has a flashpoint well in excess of 100° C. This material has been found to have particular utility in protecting automotive paint spray booths and has the additional advantage of providing a slightly tacky surface which will scavenge airborne dust from paint spray areas.

This material was tested as a paint booth protectant, in comparison with thickened glycerol-based material utilized in the prior art. Portions of a steel test panel were coated with the composition of the present invention and with the thickened glycerol. Sections of the panel were sprayed with water-based paint and solvent-based paint. It was found that the composition of the present invention permitted the ready removal of both solvent and water-based paints by a low pressure water wash. In comparison, the thickened glycerol material allowed for removal of most of the solvent-based paint by a water rinse, but it was found that a significant amount of the water-based paint penetrated through the glycerol-based material and was not removed by a water wash.

Because of its high solvating power, the material of the present invention has also been found to have utility as a cleaner for removing paint overspray from articles which may not have been previously coated with the protective coating.

In view of the teaching presented herein, other formulations of the present invention will be readily apparent to one of skill in the art. Likewise, the material of the present invention may be adapted to applications other than those disclosed herein. For example, the protective material of the present invention can be used to protect articles from overspray build up of other coatings such as adhesives, polymers, asphalts and the like.

The foregoing discussion and examples are illustrative of particular embodiments and uses of the present invention, but are not meant to be a limitation upon the practice thereof. It is the following claims, including all equivalents, which define the scope of the invention.

What is claimed is:

1. A water removable protective coating comprising:
   a hydrophobic solvent which is a C1–C4 alkyl ester of a C16–C18 fatty acid;
   a surfactant, in an amount sufficient to render the hydrophobic solvent water dispersible; and
   a thickening agent comprising fumed silica.

2. The composition of claim 1, wherein the surfactant is a nonionic surfactant.

3. The composition of claim 1, wherein the hydrophobic solvent comprises, by weight, at least 70% of the composition.

4. The composition of claim 1, wherein the hydrophobic solvent comprises, by weight, at least 90% of the composition.

5. The composition of claim 1, wherein the surfactant comprises, by weight, 0.1–10% of the composition.

6. The composition of claim 1, wherein the surfactant comprises, by weight, 0.25–2% of the composition.

7. The composition of claim 1, wherein the thickening agent comprises, by weight, 0.25–20% of the composition.

8. The composition of claim 1, wherein the thickening agent comprises, by weight, 0.5–15% of the composition.

9. The composition of claim 1, wherein the thickening agent comprises, by weight, 1–10% of the composition.

10. A process for temporarily protecting a surface from overspray comprising the steps of:
    providing a protective composition comprising a hydrophobic solvent, a surfactant, and a thickening agent such that the protective composition is spreadable and capable of reversible adherence to the surface for a predetermined period of time;
    applying the protective composition to the surface, wherein the surface is subsequently exposed to overspray whose adherence to the surface is undesirable; and
    removing the protective composition from the surface, such that the overspray is removed therefrom.

11. The process of claim 10 wherein removing the protective composition is by direction of a fluid stream onto the surface.

12. The process of claim 11 wherein the fluid stream is a water stream.

13. The process of claim 12 wherein the water stream has a pressure of 1000 pounds per square inch or less.

14. The process of claim 12 wherein the water stream has a pressure of 200 pounds per square inch or less.

15. The process of claim 10 wherein the protective composition comprises:
    a C1–C4 alkyl ester of a C16–C18 fatty acid;
    a surfactant, in an amount sufficient to render the hydrophobic solvent water dispersible; and
    a thickening agent.

16. The process of claim 15 wherein the surfactant is a nonionic surfactant.

17. The process of claim 15, wherein the thickening agent is fumed silica.

18. The process of claim 15 wherein the hydrophobic solvent comprises, by weight, at least 70% of the composition.

19. The process of claim 15 wherein the hydrophobic solvent comprises, by weight, at least 90% of the composition.

20. The process of claim 15, wherein the surfactant comprises, by weight, 0.1–10% of the composition.

21. The process of claim 15, wherein the surfactant comprises, by weight, 0.5–5% of the composition.

22. The process of claim 15, wherein the thickening agent comprises, by weight, 0.25–20% of the composition.

23. The process of claim 15, wherein the thickening agent comprises, by weight, 0.5–15% of the composition.

24. The process of claim 15, wherein the thickening agent comprises, by weight, 1–10% of the composition.

25. A process for temporarily protecting a surface comprising the steps of:
    providing a removable protective composition comprising a hydrophobic solvent, a surfactant, and a thickener;
    applying the protective composition to the surface, wherein the surface is subsequently exposed to a substance from which the surface is to be protected; and
    removing the protective composition from the surface.

26. A water removable protective coating consisting essentially of:
    a hydrophobic solvent which is a C1–C4 alkyl ester of a C16–C18 fatty acid;
    a surfactant, in an amount sufficient to render the hydrophobic solvent water dispersible; and
    a thickening agent.

* * * * *